United States Patent
King et al.

(10) Patent No.: US 10,848,061 B2
(45) Date of Patent: Nov. 24, 2020

(54) SWITCHING POWER CONVERTER

(71) Applicant: Cirrus Logic International Semiconductor Ltd., Edinburgh (GB)

(72) Inventors: Eric J. King, Austin, TX (US); Siddharth Maru, Austin, TX (US); John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/239,092

(22) Filed: Jan. 3, 2019

(65) Prior Publication Data
US 2019/0140540 A1 May 9, 2019

Related U.S. Application Data

(63) Continuation of application No. 15/283,839, filed on Oct. 3, 2016, now Pat. No. 10,461,640.
(Continued)

(51) Int. Cl.
*H02M 1/00* (2006.01)
*H02M 3/158* (2006.01)
(Continued)

(52) U.S. Cl.
CPC ............ *H02M 3/158* (2013.01); *H02J 7/34* (2013.01); *H02J 7/345* (2013.01); *H02M 1/084* (2013.01);
(Continued)

(58) Field of Classification Search
CPC .. H02M 1/084; H02M 1/10; H02M 2001/008; H02M 2001/009; H02M 3/158; H02M 3/1582; H02J 7/34; H02J 7/345
See application file for complete search history.

(56) References Cited

U.S. PATENT DOCUMENTS 6,166,527 A 12/2000 Dwelley et al.
6,215,286 B1 * 4/2001 Scoones ............... H02M 3/156
                                                         323/222
(Continued)

FOREIGN PATENT DOCUMENTS

EP     1804368 A1    7/2007
EP     2571153 A1    3/2013
(Continued)

OTHER PUBLICATIONS

International Search Report and Written Opinion of the International Searching Authority, International Application No. PCT/US2016/061327, dated Feb. 23, 2017.
(Continued)

*Primary Examiner* — Jue Zhang
*Assistant Examiner* — David A. Singh
(74) *Attorney, Agent, or Firm* — Jackson Walker L.L.P.

(57) ABSTRACT

An apparatus may include a power converter having a power supply input for receiving an input power supply voltage generated by a power supply, an output for generating an output voltage to a load, and a power inductor coupled between the power supply input and the output may and further include an energy storage element coupled to the power supply input, the power inductor, and the output such that operation of the power inductor is split temporally between delivering energy to the energy storage element and delivering energy to the load, and operation of the energy storage element is split temporally between delivering energy to the load and receiving energy from one or both of the power supply and the load.

20 Claims, 5 Drawing Sheets

| CONFIGURATION | 31 | 32 | 33 | 34 | 35 | 36 | 37 | PROPOSED ENERGY TRANSFER/EFFECT |
|---|---|---|---|---|---|---|---|---|
| A | 1 | 0 | 0 | 1 | 0 | 0 | 0 | CHARGE POWER INDUCTOR 42 FROM BATTERY 40 |
| B | 1 | 0 | 1 | 0 | 0 | 0 | 0 | TRANSFER ENERGY FROM POWER INDUCTOR 42 TO LOAD AT OUTPUT OF SMPS 30 |
| C | 1 | 0 | 0 | 0 | 1 | 0 | 0 | TRANSFER ENERGY FROM POWER INDUCTOR 42 TO CAPACITOR 44 |
| D | 0 | 0 | 0 | 1 | 0 | 1 | 0 | CHARGE POWER INDUCTOR 42 FROM CAPACITOR 44 |
| E | 0 | 0 | 1 | 0 | 0 | 1 | 0 | TRANSFER ENERGY BETWEEN LOAD AT OUTPUT OF SMPS 30 AND CAPACITOR 44 |
| F | 0 | 1 | 1 | 0 | 0 | 0 | 0 | TRANSFER ENERGY FROM POWER INDUCTOR 42 TO LOAD AT OUTPUT OF SMPS 30 |
| G | 0 | 1 | 0 | 0 | 1 | 0 | 0 | TRANSFER ENERGY FROM POWER INDUCTOR 42 TO CAPACITOR 44 |
| H | 0 | 1 | 0 | 1 | 0 | 0 | 0 | MAINTAIN INDUCTOR CURRENT |
| I | 0 | 0 | 0 | 1 | 0 | 0 | 1 | TRANSFER ENERGY TO POWER INDUCTOR 42 FROM LOAD AT OUTPUT OF SMPS 30 |
| J | 0 | 0 | 0 | 0 | 1 | 0 | 1 | TRANSFER ENERGY FROM LOAD AT OUTPUT OF SMPS 30 TO CAPACITOR 44 |

Related U.S. Application Data

(60) Provisional application No. 62/255,960, filed on Nov. 16, 2015.

(51) Int. Cl.
 *H02M 1/088* (2006.01)
 *H02M 1/10* (2006.01)
 *H02J 7/34* (2006.01)
 *H02M 1/084* (2006.01)

(52) U.S. Cl.
 CPC .............. *H02M 1/10* (2013.01); *H02M 1/088* (2013.01); *H02M 3/1582* (2013.01); *H02M 2001/008* (2013.01); *H02M 2001/009* (2013.01)

(56) References Cited

U.S. PATENT DOCUMENTS

| | | | |
|---|---|---|---|
| 6,348,779 B1* | 2/2002 | Sluijs | H02M 3/1582 323/222 |
| 6,348,781 B1 | 2/2002 | Midya et al. | |
| 6,355,990 B1 | 3/2002 | Mitchell | |
| 2004/0239299 A1 | 12/2004 | Vinciarelli | |
| 2006/0238029 A1 | 10/2006 | Hoon et al. | |
| 2011/0199062 A1* | 8/2011 | Singnurkar | H02M 3/1582 323/282 |
| 2012/0229110 A1* | 9/2012 | Huang | H02M 3/1582 323/282 |
| 2013/0119966 A1* | 5/2013 | Touzani | H02M 3/1582 323/312 |
| 2013/0264870 A1* | 10/2013 | Keysar | H02J 1/00 307/24 |
| 2014/0232359 A1* | 8/2014 | Dash | H02M 3/158 323/235 |
| 2014/0246908 A1* | 9/2014 | Chew | H02M 3/156 307/24 |
| 2015/0222184 A1* | 8/2015 | Melanson | H02M 3/1582 323/271 |
| 2016/0099582 A1* | 4/2016 | Ramorini | H02J 7/0052 320/162 |
| 2016/0329830 A1* | 11/2016 | Hussain | H02M 7/537 |
| 2017/0141675 A1 | 5/2017 | King et al. | |

FOREIGN PATENT DOCUMENTS

| | | |
|---|---|---|
| EP | 2835900 A1 | 2/2015 |
| GB | 2484012 A | 3/2012 |
| WO | 200113502 A1 | 2/2001 |
| WO | 2016179515 A1 | 11/2016 |

OTHER PUBLICATIONS

Combined Search and Examination Report under Sections 17 and 18(3), Application No. GB1619079.5, dated Apr. 18, 2017.

First Examination Opinion Notice, State Intellectual Property Office of the People's Republic of China, Application No. 201680078276. 9, dated Oct. 30, 2019.

* cited by examiner

| CONFIGURATION | 31 | 32 | 33 | 34 | 35 | 36 | 37 | PROPOSED ENERGY TRANSFER/EFFECT |
|---|---|---|---|---|---|---|---|---|
| A | 1 | 0 | 0 | 1 | 0 | 0 | 0 | CHARGE POWER INDUCTOR 42 FROM BATTERY 40 |
| B | 1 | 0 | 1 | 0 | 0 | 0 | 0 | TRANSFER ENERGY FROM POWER INDUCTOR 42 TO LOAD AT OUTPUT OF SMPS 30 |
| C | 1 | 0 | 0 | 0 | 1 | 0 | 0 | TRANSFER ENERGY FROM POWER INDUCTOR 42 TO CAPACITOR 44 |
| D | 0 | 0 | 0 | 1 | 0 | 1 | 0 | CHARGE POWER INDUCTOR 42 FROM CAPACITOR 44 |
| E | 0 | 0 | 1 | 0 | 0 | 1 | 0 | TRANSFER ENERGY BETWEEN LOAD AT OUTPUT OF SMPS 30 AND CAPACITOR 44 |
| F | 0 | 1 | 1 | 0 | 0 | 0 | 0 | TRANSFER ENERGY FROM POWER INDUCTOR 42 TO LOAD AT OUTPUT OF SMPS 30 |
| G | 0 | 1 | 0 | 0 | 1 | 0 | 0 | TRANSFER ENERGY FROM POWER INDUCTOR 42 TO CAPACITOR 44 |
| H | 0 | 1 | 0 | 1 | 0 | 0 | 0 | MAINTAIN INDUCTOR CURRENT |
| I | 0 | 0 | 0 | 1 | 0 | 0 | 1 | TRANSFER ENERGY TO POWER INDUCTOR 42 FROM LOAD AT OUTPUT OF SMPS 30 |
| J | 0 | 0 | 0 | 0 | 1 | 0 | 1 | TRANSFER ENERGY FROM LOAD AT OUTPUT OF SMPS 30 TO CAPACITOR 44 |

FIG. 4

SWITCHING POWER CONVERTER

RELATED APPLICATIONS

This application is a continuation of U.S. patent application Ser. No. 15/283,839, filed Oct. 3, 2016, which claims priority to U.S. Provisional Patent Application Ser. No. 62/255,960, filed Nov. 16, 2015, each of which is incorporated by reference herein in its entirety.

FIELD OF DISCLOSURE

The present disclosure relates in general to circuits for audio devices, including without limitation personal audio devices such as wireless telephones and media players, and more specifically, to a switched mode power supply for supplying a supply voltage to an amplifier or other load.

BACKGROUND

Personal audio devices, including wireless telephones, such as mobile/cellular telephones, cordless telephones, mp3 players, and other consumer audio devices, are in widespread use. Such personal audio devices may include circuitry for driving a pair of headphones or one or more speakers. Such circuitry often includes a power amplifier for driving an audio output signal to headphones or speakers. Generally speaking, a power amplifier amplifies an audio signal by taking energy from a power supply and controlling an audio output signal to match an input signal shape but with a larger amplitude. Although many amplifier architectures (e.g., Class A, Class B, and Class AB amplifiers) provide for only a single power supply for a power amplifier, some architectures provide for at least two supply voltages for powering a power amplifier, in order to achieve greater power efficiency over single or constant power supply voltage architectures.

One example of a multi-supply voltage amplifier is a Class H amplifier. A Class H amplifier may have an infinitely variable voltage supply rail that tracks an envelope of an output signal of the Class H amplifier. In order to provide such an infinitely variable voltage supply rail, the output supply rail may be modulated such that the rail is only slightly larger than a magnitude of the audio output signal at any given time. For example, switched-mode power supplies may be used to create the output signal-tracking voltage rails. Accordingly, a Class H amplifier may increase efficiency by reducing the wasted power at output driving transistors of the amplifier.

SUMMARY

In accordance with the teachings of the present disclosure, one or more disadvantages and problems associated with existing approaches to driving an audio output signal to an audio transducer may be reduced or eliminated.

In accordance with embodiments of the present disclosure, an apparatus may include a power converter having a power supply input for receiving an input power supply voltage generated by a power supply, an output for generating an output voltage to a load, and a power inductor coupled between the power supply input and the output, and further include an energy storage element coupled to the power supply input, the power inductor, and the output such that operation of the power inductor is split temporally between delivering energy to the energy storage element and delivering energy to the load, and operation of the energy storage element is split temporally between delivering energy to the load and receiving energy from one or both of the power supply and the load.

In accordance with these and other embodiments of the present disclosure, a method may include, in a power converter having a power supply input for receiving an input power supply voltage generated by a power supply, an output for generating an output voltage to a load, and a power inductor coupled between the power supply input and the output, and further having an energy storage element coupled to the power supply input, the power inductor, and the output, operating the power converter such that the power inductor is split temporally between delivering energy to the energy storage element and delivering energy to the load, and operating the power converter such that the energy storage element is split temporally between delivering energy to the load and receiving energy from one or both of the power supply and the load.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4 illustrates a table setting forth a plurality of useful switch configurations of the switched-mode power supply of FIG. 3, in accordance with embodiments of the present disclosure;

DETAILED DESCRIPTION

Figure 1:
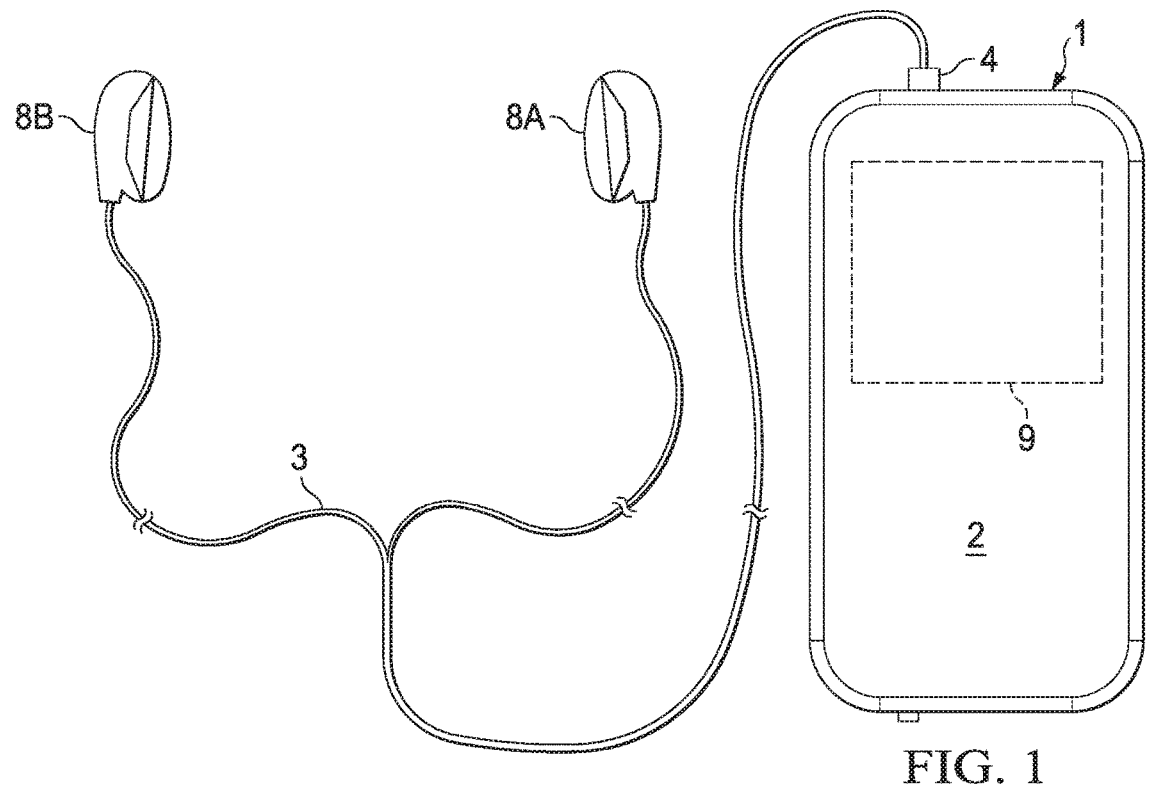
FIG. 1 is an illustration of an example personal audio device, in accordance with embodiments of the present disclosure.

FIG. 1 is an illustration of an example personal audio device 1, in accordance with embodiments of the present disclosure. FIG. 1 depicts personal audio device 1 coupled to a headset 3 in the form of a pair of earbud speakers 8A and 8B. Headset 3 depicted in FIG. 1 is merely an example, and it is understood that personal audio device 1 may be used in connection with a variety of audio transducers, including without limitation, headphones, earbuds, in-ear earphones, and external speakers. A plug 4 may provide for connection of headset 3 to an electrical terminal of personal audio device 1. Personal audio device 1 may provide a display to a user and receive user input using a touch screen 2, or alternatively, a standard liquid crystal display (LCD) may be combined with various buttons, sliders, and/or dials disposed on the face and/or sides of personal audio device 1. As also shown in FIG. 1, personal audio device 1 may include an audio integrated circuit (IC) 9 for generating an analog audio signal for transmission to headset 3 and/or another audio transducer.

Figure 2:
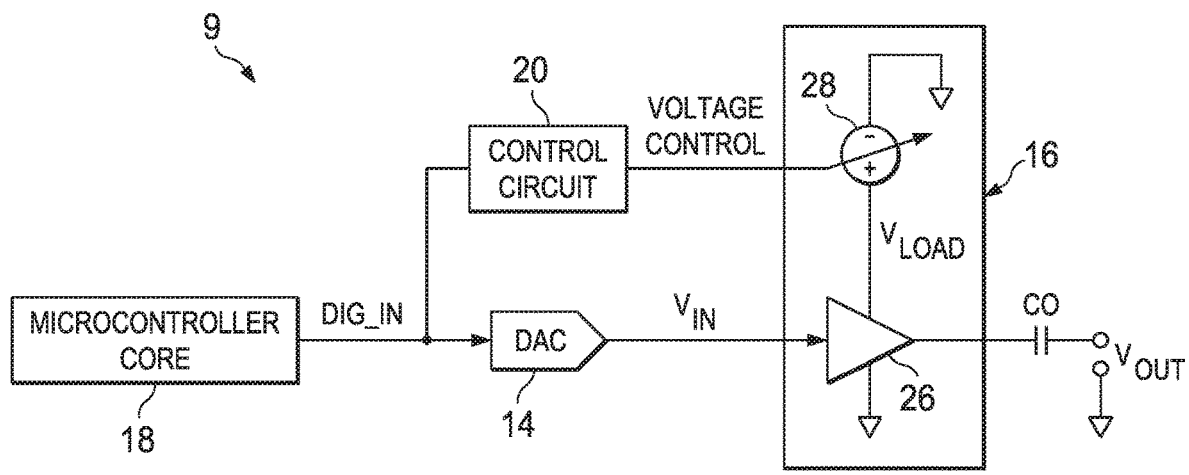
FIG. 2 is a block diagram of selected components of an example audio integrated circuit of a personal audio device, in accordance with embodiments of the present disclosure.

FIG. 2 is a block diagram of selected components of an example audio IC 9 of a personal audio device, in accordance with embodiments of the present disclosure. In some embodiments, example audio IC 9 may be used to implement audio IC 9 of FIG. 1. As shown in FIG. 2, a microcontroller core 18 may supply a digital audio input signal DIG_IN to a digital-to-analog converter (DAC) 14, which may convert the digital audio input signal to an analog signal $V_{IN}$. DAC 14 may supply analog signal $V_{IN}$ to an amplifier stage 16 which may amplify or attenuate audio input signal $V_{IN}$ to provide an audio output signal $V_{OUT}$, which may operate a speaker, headphone transducer, a line level signal output, and/or other suitable output. A capacitor CO may be utilized to couple the output signal to the transducer or line level output, particularly if amplifier stage 16 is operated from a unipolar power supply having a quiescent voltage substantially differing from ground. Also, as shown in FIG. 2, audio IC 9 may include a control circuit 20 configured to, based on digital audio input signal DIG_IN, control a power supply voltage of amplifier stage 16 using one or more control signals (labeled as "VOLTAGE CONTROL" in FIG. 2).

As depicted in FIG. 2, amplifier stage 16 may include a Class H amplifier 26 which has an input for receiving analog signal $V_{IN}$, an output for generating output signal $V_{OUT}$ based on and indicative of analog signal $V_{IN}$, and a power supply input for receiving a variable load voltage $V_{LOAD}$ output by a variable power supply 28, wherein variable power supply 28 outputs variable load voltage $V_{LOAD}$ based on one or more control signals VOLTAGE CONTROL. Load voltage $V_{LOAD}$ output by variable power supply 28 may be selected from a plurality of discrete voltages, or may include an infinite number of voltages between a minimum and maximum voltage.

Figure 3:
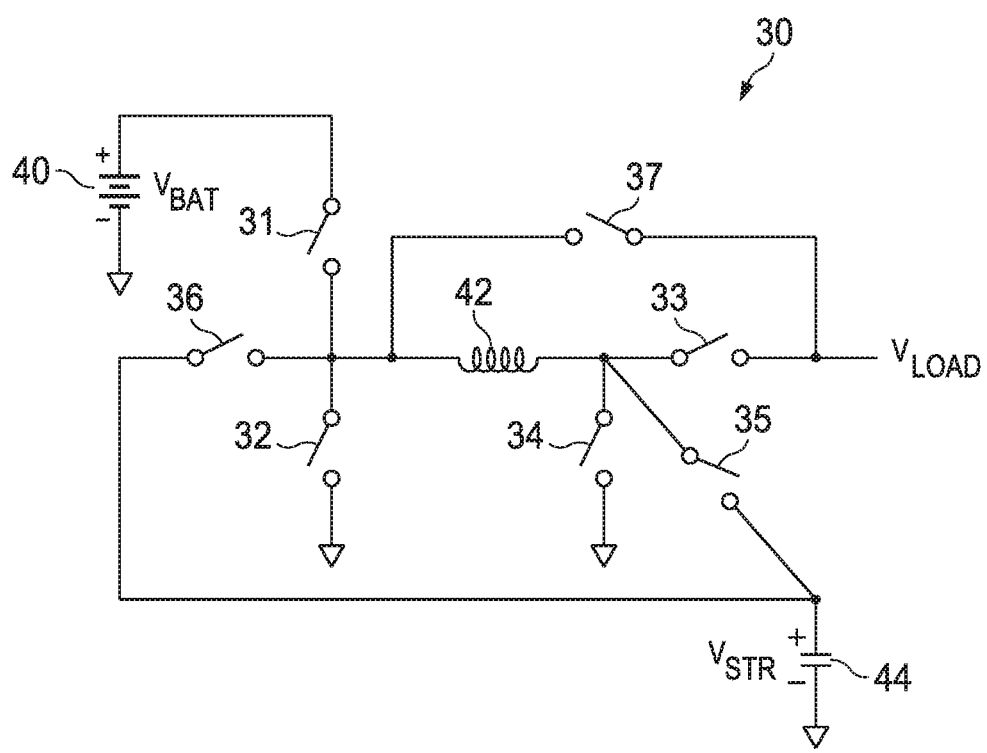
FIG. 3 is a block diagram of selected components of an example switched-mode power supply, in accordance with embodiments of the present disclosure.

FIG. 3 is a block diagram of selected components of an example switched-mode power supply 30, in accordance with embodiments of the present disclosure. In some embodiments, example switched-mode power supply 30 may be used to implement variable power supply 28 of FIG. 2. As shown in FIG. 3, switched-mode power supply 30 may include a battery 40 or other voltage source configured to output a battery voltage $V_{BAT}$. Battery 40 may comprise any suitable energy storage device, including without limitation one or more electrochemical cells configured to convert chemical energy into electrical energy at the terminals of battery 40. As shown in FIG. 3, switched-mode power supply 30 may also include an output at which switched-mode power supply 30 may generate a single-ended load voltage $V_{LOAD}$.

Switched-mode power supply 30 may comprise a power inductor 42 and a plurality of switches 31-37. Power inductor 42 may comprise any passive two-terminal electrical component which resists changes in electrical current passing through it and such that when electrical current flowing through it changes, a time-varying magnetic field induces a voltage in power inductor 42, in accordance with Faraday's law of electromagnetic induction, which opposes the change in current that created the magnetic field.

Each switch 31-37 may comprise any suitable device, system, or apparatus for making a connection in an electric circuit when the switch is enabled (e.g., activated, closed, or on) and breaking the connection when the switch is disabled (e.g., deactivated, open, or off) in response to a control signal received by the switch. For purposes of clarity and exposition, control signals for switches 31-37 (e.g., control signals communicated from control circuit 20) are not depicted although such control signals would be present to selectively enable and disable switches 31-37. In some embodiments, a switch 31-37 may comprise an n-type metal-oxide-semiconductor field-effect transistor.

Switch 31 may be coupled between a positive input terminal of the battery 40 and a first terminal of power inductor 42. Switch 32 may be coupled between a negative input terminal of battery 40 (e.g., a ground voltage) and the first terminal of power inductor 42. Switch 33 may be coupled between a second terminal of power inductor 42 and the output of switched-mode power supply 30. Switch 34 may be coupled between the second terminal of power inductor 42 and the negative input terminal of battery 40 (e.g., ground voltage). Switch 35 may be coupled between the second terminal of power inductor 42 and a first terminal of capacitor 44 or another energy storage element. Switch 36 may be coupled between the first terminal of power inductor 42 and the first terminal of capacitor 44. Switch 37 (which, in some embodiments, may not be present in switched-mode power supply 30), may be coupled between the output of switched-mode power supply 30 and the first terminal of power inductor 42.

Capacitor 44 may be coupled at its second terminal to the negative input terminal of battery 40 (e.g., ground voltage). Capacitor 44 may comprise any electrical component used to temporarily store electrical energy in an electric field. In some embodiments, capacitor 44 may be replaced with any other component capable of storing energy. For example, in some embodiments, capacitor 44 may be replaced with a rechargeable battery.

In operation, switches 31-34 may be controlled by control circuit 20 such that switched-mode power supply 30 operates in a plurality of modes including at least a boost mode in which switched-mode power supply 30 generates its output voltage (e.g., load voltage $V_{LOAD}$) greater than its input power supply voltage (e.g., battery voltage $V_{BAT}$) and a buck mode in which switched-mode power supply 30 generates its output voltage (e.g., load voltage $V_{LOAD}$) lesser than its input power supply voltage (e.g., battery voltage $V_{BAT}$). For example, to operate in a buck mode, control circuit 20 may enable switch 33, disable switch 34, and sequentially commutate switches 31 and 32 in a charging phase and discharging phase, respectively. To operate in a boost mode, control circuit 20 may enable switch 31, disable switch 32, and sequentially commutate switches 33 and 34 in a charging phase and discharging phase, respectively. Thus, in essence, switched-mode power supply 30 operates as a power converter.

In addition, control circuit 20 may control switches 31-37 such that operation of power inductor 42 is split temporally between delivering energy to capacitor 44 and delivering energy to a load at the output of switched-mode power supply 30 and such that operation of capacitor 44 is split temporally between delivering energy to the load at the output of switched-mode power supply 30 and receiving energy from one or both of battery 40 and the load at the output of switched-mode power supply 30. For example, when switch 33 is enabled and switch 35 is disabled, either energy may be delivered to the load at the output of switched-mode power supply 30 from power inductor 42, or energy may be delivered from the load at the output of switched-mode power supply 30 to power inductor 42, via the second terminal of power inductor 42. As a further example, when switch 36 is enabled, energy may be delivered to power inductor 42 from capacitor 44. Additionally, when switch 37 is enabled, energy may be delivered from the load at the output of switched-mode power supply 30 to power inductor 42, via the first terminal of power inductor 42. Further, when switches 35 and 36 are both disabled, capacitor 44 may neither receive energy from nor deliver energy to other components of switched-mode power supply 30.

As an example of control of switches 31-37, FIG. 4 illustrates a table setting forth a plurality of useful switch configurations of switched-mode power supply 30, in accordance with embodiments of the present disclosure. FIG. 4 also sets forth the proposed path of energy transfer for each of the various configurations. With respect to the proposed path of energy transfer for each of the various configurations set forth in FIG. 4, other voltages present in switched-mode power supply 30 may alter transferring of charge to and from power inductor 42 from those set forth in the right-most column of FIG. 4, as would be appreciated by those of skill in the relevant art.

In each switching cycle of switched-mode power supply 30, switched-mode power supply 30 may use two or more of the configurations set forth in FIG. 4 in any suitable sequence to either charge or discharge power inductor 42 and/or to transfer energy to or from a load at the output of switched-mode power supply 30 or transfer energy to or from capacitor 44. The net effect of using two or more of these switching configurations during a switching cycle maybe either to buck or boost load voltage $V_{LOAD}$ or to buck or boost voltage $V_{STR}$ across capacitor 44. For example, switched-mode power supply 30 may, during a switching cycle, use a sequence of Config A, Config B, Config G and Config H as shown in FIG. 4, which may have the net effect of pushing energy to both the load and the storage capacitor. The exact duration of the respective configurations during a switching cycle may control whether load voltage $V_{LOAD}$ or voltage $V_{STR}$ is greater than or less than that of battery voltage $V_{BAT}$.

Figure 5:
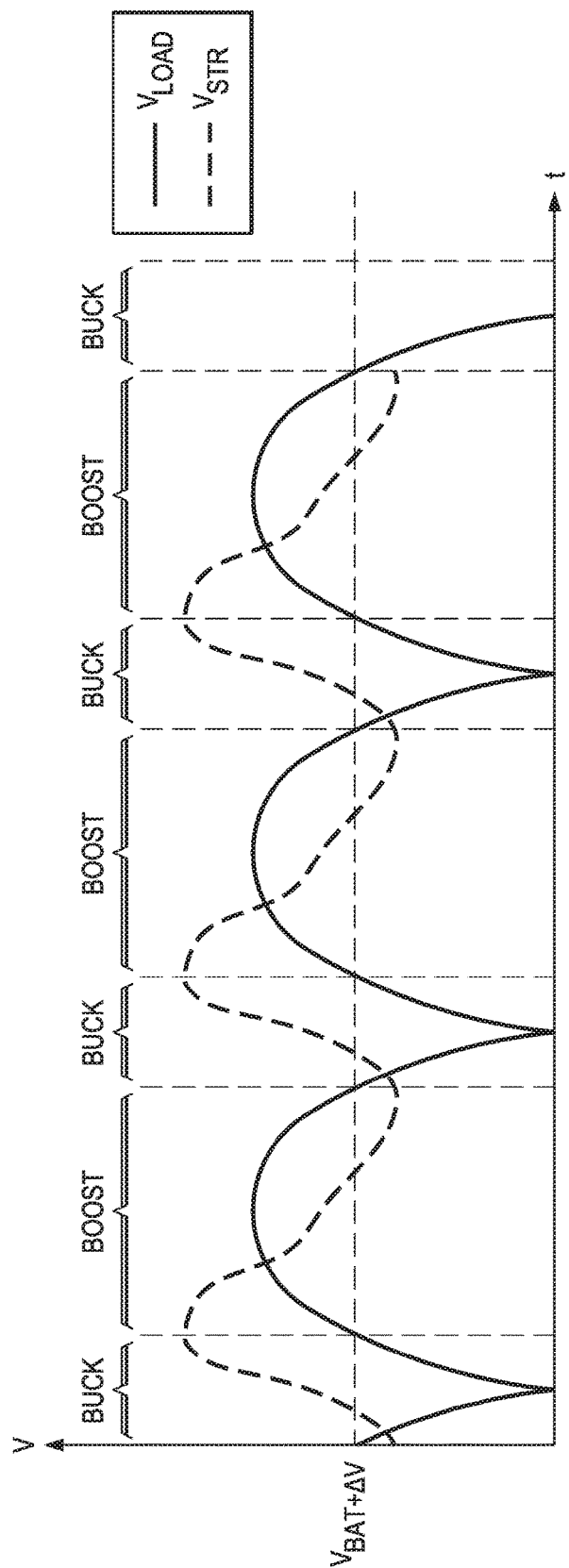
FIG. 5 illustrates a graph of an example load voltage having a rectified sinusoidal waveform, the graph indicating example ranges for operation in various operational modes of the switched-mode power supply of FIG. 3, in accordance with embodiments of the present disclosure.

FIG. 5 illustrates a graph of an example load voltage $V_{LOAD}$ having a rectified alternating-current waveform with voltage being modified as necessary to control current provided by battery 40 while maintaining desired behavior of load voltage $V_{LOAD}$, the graph indicating example ranges for operation in various operational modes of switched-mode power supply 30, in accordance with embodiments of the present disclosure. Thus, for each cycle of an alternating current full-scale signal, switched-mode power supply 30 may sequentially operate in a buck mode (e.g., for $V_{LOAD} < V_{BAT} \Delta V_1$, wherein $\Delta V_1$ may be an arbitrarily chosen voltage), a boost mode (e.g., for $V_{LOAD} > V_{BAT} \Delta V_2$, wherein $\Delta V_2$ may be an arbitrarily chosen voltage which may or may not be equal to voltage $\Delta V_1$), and then again in the buck mode. FIG. 5 also depicts an example waveform for a voltage $V_{STR}$ across capacitor 44 when load voltage $V_{LOAD}$ has a rectified sinusoidal waveform. As is evident from FIG. 5, certain intervals of time may exist in which capacitor voltage $V_{STR}$ falls below that of load voltage $V_{LOAD}$.

Thus, with the switching sequence of FIG. 4 and as demonstrated in FIG. 5, during the buck mode, energy may be transferred from battery 40 to each of the load and capacitor 44, and during the boost mode, energy may be transferred from both of battery 40 and capacitor 44 to the load. Accordingly, switched-mode power supply 30 may be able to draw substantially constant power from battery 40 and store unneeded energy pulled from battery 40 in capacitor 44. When additional energy is needed at the load, energy may be drawn from both battery 40 and capacitor 44, in some instances without the need to increase power draw from battery 40. Advantageously, such an architecture and operation may minimize peak currents drawn from battery 40, which may minimize occurrence of brownouts and other undesirable effects. Also, in the architecture of switched-mode power supply 30, unlike a standard boost converter, voltage in capacitor 44 may fall below that of battery voltage $V_{BAT}$ and load voltage $V_{LOAD}$, thus allowing more stored energy of capacitor 44 to be used than that of a boost capacitor in a boost converter.

Although capacitor 44 is shown as integral to switched-mode power supply 30, in some embodiments, a single capacitor 44 may be electrically coupled to multiple switched-mode power supplies or other components, and thus its functionality as described above may be shared among multiple switched-mode power supplies.

Although the foregoing contemplates certain switching configurations associated with certain modes (e.g., boost mode or buck mode), it is noted that operation in a certain mode does not necessarily imply any certain switch configuration. For example, when load voltage $V_{LOAD}$ is approximately equal to battery voltage $V_{BAT}$, operation in a conventional buck or boost configuration may not be possible due to the fact such operation may require excessively small switching times of switches of switched-mode power supply 30. Accordingly, in such scenarios, a buck-boost or triphase switching configuration may be used, with the net effect of a boosting or bucking of voltage.

Figure 6:
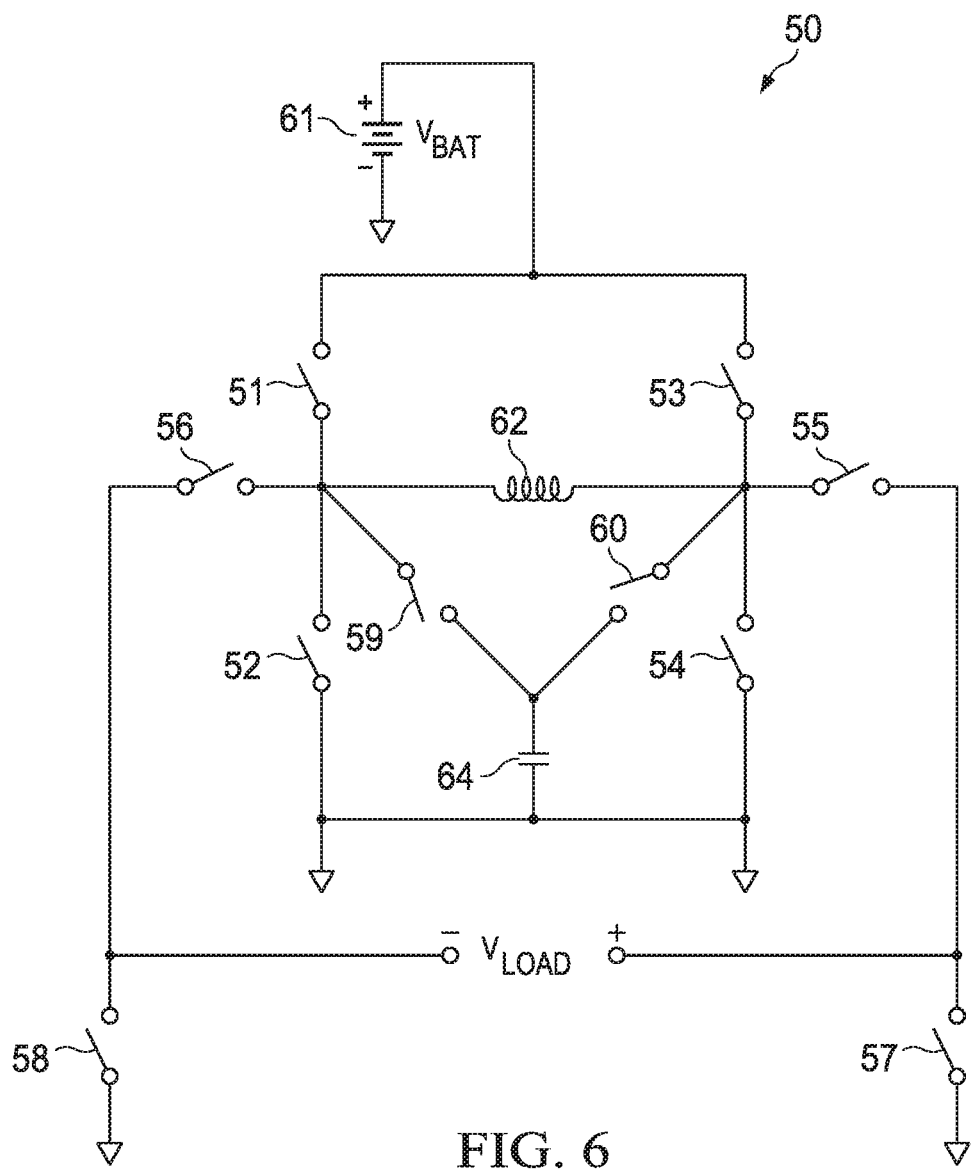
FIG. 6 is a block diagram of selected components of another example switched-mode power supply, in accordance with embodiments of the present disclosure.

FIG. 6 is a block diagram of selected components of another example switched-mode power supply 50, in accordance with embodiments of the present disclosure. In some embodiments, example switched-mode power supply 50 may be used to implement variable power supply 28 of FIG. 2.

As shown in FIG. 6, switched-mode power supply 50 may include a battery 61 or other voltage source configured to output a battery voltage $V_{BAT}$. Battery 61 may comprise any suitable energy storage device, including without limitation one or more electrochemical cells configured to convert chemical energy into electrical energy at the terminals of battery 61. As shown in FIG. 6, switched-mode power supply 50 may also include an output at which switched-mode power supply 50 may generate a differential load voltage $V_{LOAD}$.

Switched-mode power supply 50 may comprise a power inductor 62 and a plurality of switches 51-60. Power inductor 62 may comprise any passive two-terminal electrical component which resists changes in electrical current passing through it and such that when electrical current flowing through it changes, a time-varying magnetic field induces a voltage in power inductor 62, in accordance with Faraday's law of electromagnetic induction, which opposes the change in current that created the magnetic field.

Each switch 51-60 may comprise any suitable device, system, or apparatus for making a connection in an electric circuit when the switch is enabled (e.g., activated, closed, or on) and breaking the connection when the switch is disabled (e.g., deactivated, open, or off) in response to a control signal received by the switch. For purposes of clarity and exposition, control signals for switches 51-60 (e.g., control signals communicated from control circuit 20) are not depicted, although such control signals would be present to selectively enable and disable switches 51-60. In some embodiments, a switch 51-60 may comprise an n-type metal-oxide-semiconductor field-effect transistor.

Switch 51 may be coupled between a positive input terminal of the battery 61 and a first terminal of power inductor 62. Switch 52 may be coupled between a negative input terminal of battery 61 (e.g., a ground voltage) and the first terminal of power inductor 62. Switch 53 may be coupled between the positive input terminal of the battery 61 and a second terminal of power inductor 62. Switch 54 may be coupled between the negative input terminal of battery 61 (e.g., a ground voltage) and the second terminal of power inductor 62. Switch 55 may be coupled between the second terminal of power inductor 62 and a positive output terminal of switched-mode power supply 50. Switch 56 may be coupled between the first terminal of power inductor 62 and a negative output terminal of switched-mode power supply 50. Switch 57 may be coupled between the positive output terminal of switched-mode power supply 50 and the negative input terminal of battery 61 (e.g., a ground voltage). Switch 57 may be coupled between the negative output terminal of switched-mode power supply 50 and the negative input terminal of battery 61 (e.g., a ground voltage). Switch 59 may be coupled between the first terminal of power inductor 62 and a first terminal of a capacitor 64. Switch 60 may be coupled between the second terminal of power inductor 62 and the first terminal of a capacitor 64.

Capacitor 64 may be coupled at its second terminal to the negative input terminal of battery 61 (e.g., ground voltage). Capacitor 64 may comprise any electrical component used to temporarily store electrical energy in an electric field. In some embodiments, capacitor 64 may be replaced with any other component capable of storing energy. For example, in some embodiments, capacitor 64 may be replaced with a rechargeable battery.

In operation, switches 51-58 may be controlled by control circuit 20 such that switched-mode power supply 50 operates in a plurality of modes including at least a boost mode in which switched-mode power supply 50 generates its output voltage (e.g., load voltage $V_{LOAD}$) greater than its input power supply voltage (e.g., battery voltage $V_{BAT}$) and a buck mode in which switched-mode power supply 50 generates its output voltage (e.g., load voltage $V_{LOAD}$) lesser than its input power supply voltage (e.g., battery voltage $V_{BAT}$). In addition, such switches 51-58 may be controlled by control circuit 20 such that switched-mode power supply 50 may output either positive or negative voltages of load voltage $V_{LOAD}$, in contrast to switched-mode power supply 30 of FIG. 3, which may be capable of only generating positive voltages of load voltage $V_{LOAD}$.

To illustrate, when generating a positive load voltage $V_{LOAD}$, to operate in a buck mode, control circuit 20 may enable switches 55 and 58, disable switches 53, 54, 56 and 57, and sequentially commutate switches 51 and 52. To operate in a boost mode when generating a positive load voltage $V_{LOAD}$, control circuit 20 may enable switches 51 and 58, disable switches 52, 53, 56, and 57, and sequentially commutate switches 54 and 55. On the other hand, when generating a negative load voltage $V_{LOAD}$, to operate in a buck mode, control circuit 20 may enable switches 56 and 57, disable switches 51, 52, 55 and 58, and sequentially commutate switches 53 and 54. To operate in a boost mode when generating a negative load voltage $V_{LOAD}$, control circuit 20 may enable switches 53 and 57, disable switches 51, 54, 55, and 58, and sequentially commutate switches 52 and 56. Thus, in essence, switched-mode power supply 30 operates as a power converter with a differential output that can generate either positive or negative values for load voltage $V_{LOAD}$.

In addition, control circuit 20 may control switches 51-60 such that operation of power inductor 62 is split temporally between delivering energy to capacitor 64 and delivering energy to a load at the output of switched-mode power supply 50 and such that operation of capacitor 64 is split temporally between delivering energy to the load at the output of switched-mode power supply 50 and receiving energy from one or both of battery 61 and the load at the output of switched-mode power supply 50. For example, when either of switches 55 and 56 is enabled and switches 59 and 60 are disabled, either energy may be delivered to the load at the output of switched-mode power supply 50 from power inductor 62, or energy may be delivered from the load at the output of switched-mode power supply 50 to power inductor 62. As another example, when switches 55 and 60 are enabled, either energy may be delivered to the load at the output of switched-mode power supply 50 from capacitor 64, or energy may be delivered from the load at the output of switched-mode power supply 50 to capacitor 64. As a further example, when either of switches 59 and 60 is enabled, energy may be delivered to power inductor 62 from capacitor 64. Further, when switches 59 and 60 are both disabled, capacitor 44 may neither receive energy from nor deliver energy to other components of switched-mode power supply 30.

Switched-mode power supply 50 may be seen as the differential-output equivalent to the single-ended implementation of switched-mode power supply 30.

Figure 7:
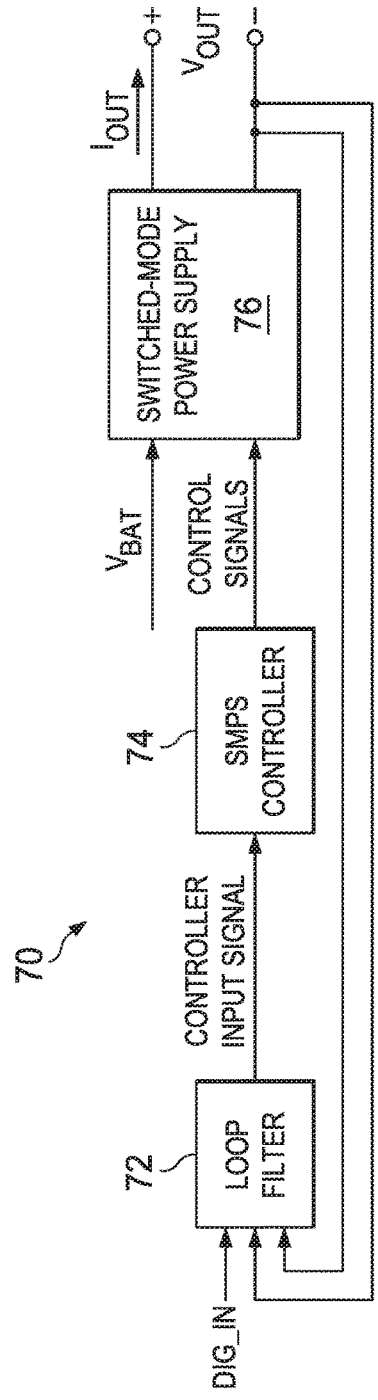
FIG. 7 is a block diagram of selected components of another example audio integrated circuit of a personal audio device, in accordance with embodiments of the present disclosure.

Although the foregoing discussion has contemplated that switched-mode power supply 30 and switched-mode power supply 50 may be used as a variable voltage supply to an audio amplifier for processing an audio signal, in some embodiments, switched-mode power supply 30 and/or switched-mode power supply 50 may be used to generate an audio output signal within an amplifier, rather than supplying a supply voltage to such an amplifier for operation of the amplifier. For example, FIG. 7 is a block diagram of selected components of an example switched-mode amplifier 70, in accordance with embodiments of the present disclosure. In some embodiments, switched-mode amplifier 70 may be used in lieu of amplifier 16 described with respect to FIG. 2. As shown in FIG. 7, switched-mode amplifier 70 may comprise a loop filter 72, a switched-mode converter controller 74, and a switched-mode power supply 76.

Loop filter 72 may comprise any system, device, or apparatus configured to receive an input signal (e.g., digital audio input signal DIG_IN or a derivative thereof) and a feedback signal (e.g., audio output signal $V_{OUT}$, a derivative thereof, or other signal indicative of audio output signal $V_{OUT}$) and based on such input signal and feedback signal, generate a controller input signal to be communicated to switched-mode power supply controller 74. In some embodiments, such controller input signal may comprise a signal indicative of an integrated error between the input signal and the feedback signal. In other embodiments, such controller input signal may comprise a signal indicative of a target current signal to be driven as an output current $I_{OUT}$ or a target voltage signal to be driven as an output voltage $V_{OUT}$ to a load coupled to the output terminals of switched-mode power supply 76.

Switched-mode power supply controller 74 may comprise any system, device, or apparatus configured to, based on the controller input signal, sequentially select among a plurality of switch configurations of switched-mode power supply 76 and based on an input signal (e.g., digital audio input signal DIG_IN), output signal $V_{OUT}$, and/or other characteristics of switched-mode amplifier 70, communicate a plurality of control signals to switched-mode power supply 76 to apply a switch configuration from a plurality of switch configurations of switches (e.g., switches 31-37 or switches 51-60) of switched-mode power supply 76 to selectively activate or deactivate each of the plurality of switches in order to transfer electrical energy from a battery or other power supply providing a voltage $V_{BAT}$ to the load of switched-mode amplifier 70 in accordance with the input signal.

Switched-mode power supply 76 may receive a voltage $V_{BAT}$ at its input, and may generate at its output audio output signal $V_{OUT}$. Although not explicitly shown in FIG. 7, in some embodiments, voltage $V_{BAT}$ may be received via input terminals including a positive input terminal and a negative input terminal which may be coupled to a ground voltage. Switched-mode power supply 76 may comprise a power inductor (e.g., power inductor 42 or power inductor 62) and a plurality of switches (e.g., switches 31-37 or switches 51-60) that are controlled by control signals received from switched-mode power supply controller 74 in order to convert voltage $V_{BAT}$ to audio output signal $V_{OUT}$, such that audio output signal $V_{OUT}$ is a function of the input signal to loop filter 72. Switched-mode power supply 76 may be implemented by switched-mode power supply 30, switched-mode power supply 50, or any other suitable circuit.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An apparatus comprising:
a power converter having a power supply input for receiving an input voltage from a power source, an output for generating an output voltage to a load, an energy storage element, and a power inductor; and
a plurality of switches including a first switch coupling the power inductor to the power supply input, a second switch coupling the power inductor to the energy storage element, and a third switch coupling the power inductor to the output;
wherein the plurality of switches are configured to be controlled within a single switching cycle such that:
at a first time, the first switch is enabled, the second switch is disabled, and the third switch is disabled;
at a second time after the first time, the first switch is enabled, the second switch is disabled, and the third switch is enabled;
at a third time after the second time, the first switch is disabled, the second switch is enabled, and the third switch is disabled; and
at a fourth time after the third time, the first switch is disabled, the second switch is disabled, and the third switch is disabled.

2. The apparatus of claim 1, wherein the power converter comprises a switched-mode power converter, and wherein the plurality of switches are configured to be controlled such that the power converter operates in a plurality of modes comprising at least:
a boost mode in which the power converter generates the output voltage greater than the input voltage; and
a buck mode in which the power converter generates the output voltage lesser than the input voltage.

3. The apparatus of claim 2, wherein at least one switching cycle of the power converter in the boost mode comprises a charging phase and a discharging phase such that:
during the charging phase, the power inductor is charged from the power source and the energy storage element; and
during the discharging phase, the power inductor is discharged to the load.

4. The apparatus of claim 2, wherein at least one switching cycle of the power converter in the buck mode comprises a charging phase and a discharging phase such that:
during the charging phase, the power inductor is charged from the power source; and
during the discharging phase, the power inductor is discharged to the load and the energy storage element.

5. The apparatus of claim 1, wherein the energy storage element comprises a capacitor.

6. The apparatus of claim 5, wherein:
the power source comprises a first power source terminal and a second power source terminal;
the first power source terminal is coupled to the power supply input of the power converter; and
the capacitor has a first capacitor terminal coupled to the power inductor and a second capacitor terminal coupled to the second power source terminal.

7. The apparatus of claim 1, wherein the power inductor comprises a first inductor terminal coupled to the power supply input and a second inductor terminal coupled to a first storage element terminal of the energy storage element, and wherein when the third switch is enabled, either energy is delivered to the load from at least one of the energy storage element and the power inductor, or energy is delivered from the load to at least one of the energy storage element and the power inductor.

8. The apparatus of claim 7, wherein when the second switch is enabled, energy is delivered to the power inductor from the energy storage element.

9. The apparatus of claim 7, further comprising a fourth switch coupled between the first storage element terminal of the energy storage element and the load, such that when the fourth switch is enabled, energy is delivered to the energy storage element from the load.

10. The apparatus of claim 1, wherein operation of the energy storage element is split temporally among delivering energy to the load, receiving energy from one or both of the power source and the load, and neither delivering nor receiving energy.

11. A method comprising, in a power converter having a power supply input for receiving an input voltage from a power source, an output for generating an output voltage to a load, an energy storage element, a power inductor, and a plurality of switches including a first switch coupling the power inductor to the power supply input, a second switch coupling the power inductor to the energy storage element, and a third switch coupling the power inductor to the output:
operating the power converter such that, within a single switching cycle:
at a first time, the first switch is enabled, the second switch is disabled, and the third switch is disabled;
at a second time after the first time, the first switch is enabled, the second switch is disabled, and the third switch is enabled;
at a third time after the second time, the first switch is disabled, the second switch is enabled, and the third switch is disabled; and
at a fourth time after the third time, the first switch is disabled, the second switch is disabled, and the third switch is disabled.

12. The method of claim 11, wherein the power converter comprises a switched-mode power converter, the method comprising controlling the plurality of switches such that the power converter operates in a plurality of modes comprising at least:
a boost mode in which the power converter generates the output voltage greater than the input voltage; and
a buck mode in which the power converter generates the output voltage lesser than the input voltage.

13. The method of claim 12, wherein at least one switching cycle of the power converter in the boost mode comprises a charging phase and a discharging phase, the method further comprising:
during the charging phase, operating the power converter such that the power inductor is charged from the power source and the energy storage element; and
during the discharging phase, operating the power converter such that the power inductor is discharged to the load.

14. The method of claim 12, wherein at least one switching cycle of the power converter in the buck mode comprises a charging phase and a discharging phase, the method further comprising:
during the charging phase, operating the power converter such that the power inductor is charged from the power source; and
during the discharging phase, operating the power converter such that the power inductor is discharged to the load and the energy storage element.

15. The method of claim 11, wherein the energy storage element comprises a capacitor.

16. The method of claim 15, wherein:
the power source comprises a first power source terminal and a second power source terminal;
the first power source terminal is coupled to the power supply input of the power converter; and
the capacitor has a first capacitor terminal coupled to the power inductor and a second capacitor terminal coupled to the second power source terminal.

17. The method of claim 11, wherein the power inductor comprises a first inductor terminal coupled to the power supply input and a second inductor terminal coupled to a first storage element terminal of the energy storage element, the method further comprising controlling the third switch such that when the third switch is enabled, either energy is delivered to the load from at least one of the energy storage element and the power inductor, or energy is delivered from the load to at least one of the energy storage element and the power inductor.

18. The method of claim 17, wherein when the second switch is enabled, energy is delivered to the power inductor from the energy storage element.

19. The method of claim 17, further comprising controlling a fourth switch coupled between the first storage element terminal of the energy storage element and the load, such that when the fourth switch is enabled, energy is delivered to the energy storage element from the load.

20. The method of claim 11, further comprising operating the power converter such that operation of the energy storage element is split temporally among delivering energy to the load, receiving energy from one or both of the power source and the load, and neither delivering nor receiving energy.

* * * * *